March 8, 1932.  P. B. HARWOOD  1,848,251
REMOTE CONTROL SYSTEM FOR ELECTRIC MOTORS
Filed July 20, 1928   2 Sheets-Sheet 1
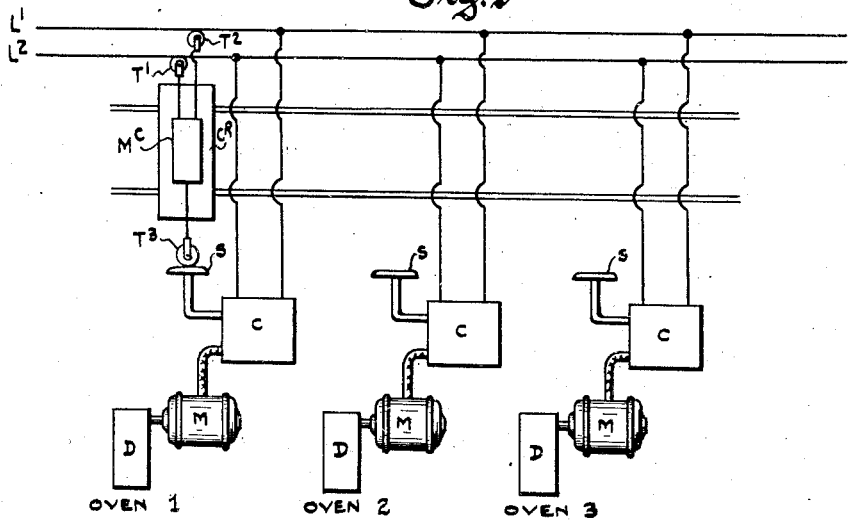
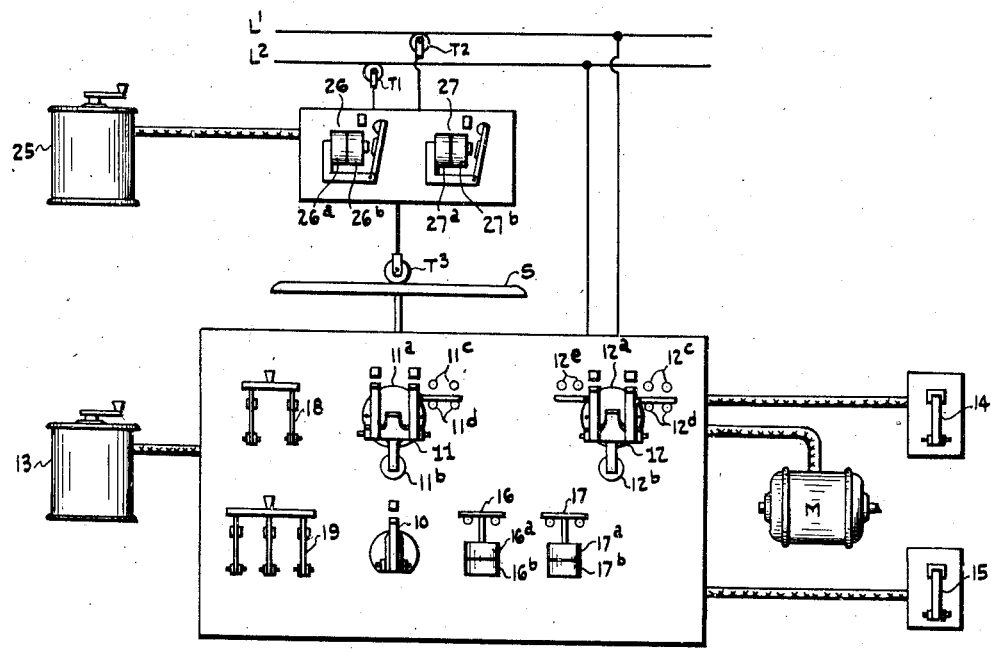
INVENTOR
Paisley B. Harwood
BY
ATTORNEY

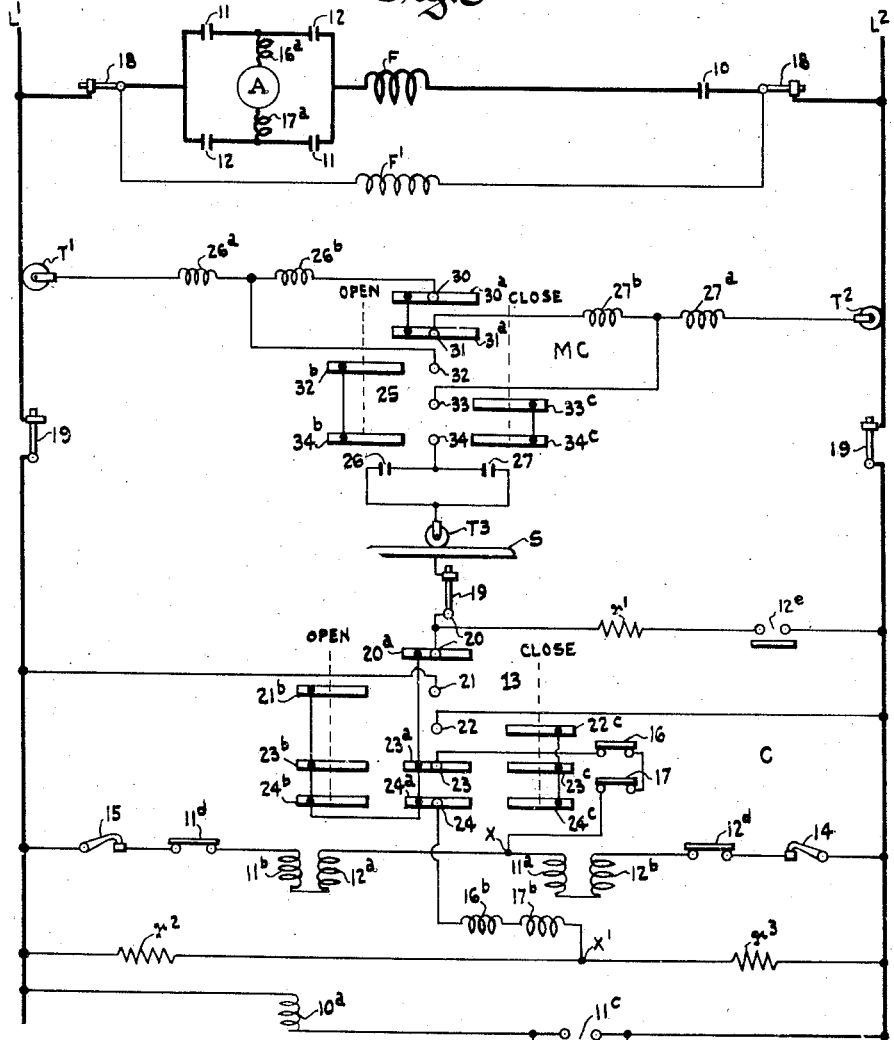
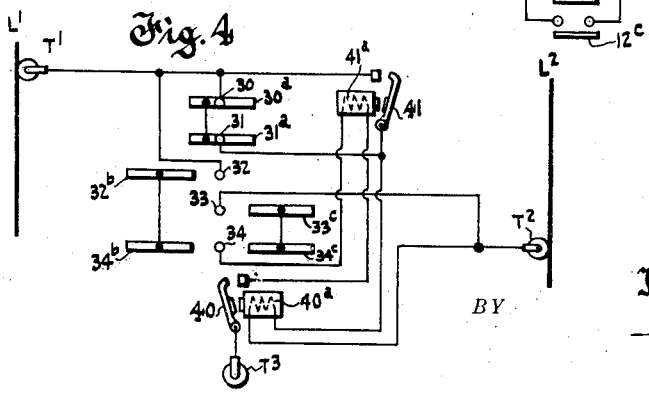

Patented Mar. 8, 1932

1,848,251

UNITED STATES PATENT OFFICE

PAISLEY B. HARWOOD, OF MILWAUKEE, WISCONSIN, ASSIGNOR, BY MESNE ASSIGNMENTS, TO CUTLER-HAMMER, INC., OF MILWAUKEE, WISCONSIN, A CORPORATION OF DELAWARE

REMOTE CONTROL SYSTEM FOR ELECTRIC MOTORS

Application filed July 20, 1928. Serial No. 294,229.

This invention relates to remote control systems for electric motors.

While not limited thereto, the invention is particularly applicable to control systems for furnace installations which employ a plurality of motor operated doors.

In installations of the aforesaid character each door is provided with an operating motor having a reversing controller associated therewith and a master controller located in a traveling car or crane provides for control of any of the motors through the medium of its associated reversing controller. It has heretofore been necessary in order to obtain the required control effects to connect the master controller to the reversing controllers through the medium of a plurality of control wires.

The present invention has among its objects to provide a simplified control system for installations of the aforesaid character in which the master controller is adapted to control the motors in the required manner through the medium of a single control wire.

Another object is to provide a control system of the aforesaid character having improved overload and no-voltage protective means associated therewith.

Various other objects and advantages of the invention will hereinafter appear.

The accompanying drawings illustrate certain embodiments of the invention which will now be described, it being understood that the embodiments illustrated may be used in systems of various types and that the same are susceptible of modification without departing from the spirit and scope of the appended claims.

In the drawings,

Figure 1 diagrammatically illustrates a furnace installation to which a control system embodying the invention is applied.

Fig. 2 illustrates the control elements of the master controller and one of the reversing controllers diagrammatically illustrated in Fig. 1.

Fig. 3 is an across-the-line diagram illustrating the circuit connections of the control elements shown in Fig. 2, and Fig. 4 is an across-the-line diagram illustrating a modified form of master controller.

Referring to Fig. 1, the same illustrates a plurality of doors D which it is assumed are associated with a battery of furnaces. Each of the doors D is provided with a driving motor M having a reversing controller C associated therewith and a master controller MC located in a traveling crane CR is adapted to control any one of the motors through the medium of its associated controller C. The master controller MC is supplied with current from lines $L^1$ $L^2$ through a pair of trolleys $T^1$ and $T^2$, and, as hereinafter set forth, the same is adapted to control any of the motors M through the medium of a single trolley $T^3$ which is arranged to make contact with shoes S, one of which is associated with each of the controllers C.

As shown in Fig. 2, each of the controllers C is provided with switches for controlling the power circuit of its associated motor comprising a single pole electromagnetically operated main switch 10 and a pair of double pole electromagnetically operated reversing switches 11 and 12. The reversing switches 11 and 12 are selectively controlled by a drum 13 through the medium of limit switches 14 and 15 and a pair of overload relays 16 and 17.

More specifically, the reversing switches 11 and 12 are each provided with an operating winding "a" and a lockout winding "b" and each is provided with normally open auxiliary contacts "c" for controlling the energizing circuit of the main switch 10 and normally closed auxiliary contacts "d" for controlling its associated lockout winding "b" and the operating winding "a" of the reversing switch. Also, for purposes hereinafter set forth reversing switch 12 is provided with normally open auxiliary contacts "e".

As shown in Fig. 3, drum 13 has extreme door opening and door closing positions and an intermediate off position, and the same is provided with a series of stationary contacts 20 to 24, inclusive. In the off position of said drum contacts 20, 23 and 24 engage electrically connected movable contacts $20^a$, $23^a$ and $24^a$. In the door opening position of said drum contacts 21, 23 and 24 are engaged by movable contacts 21$^b$, 23$^b$ and 24$^b$ which are connected to contact 24$^a$, and in the door closing position of said drum contacts 22, 23 and 24 engage electrically connected movable contacts 22$^c$, 23$^c$ and 24$^c$.

The limit switches 14 and 15 are each operated by their associated door and the former limit switch opens upon movement of the door into open position, while the latter opens upon movement of the door into closed position. The overload relays 16 and 17 are both normally closed and each is provided with a pair of operating windings "$a$" and "$b$" which function as hereinafter set forth.

In addition to the aforementioned control elements each of the controllers C is provided with a double pole knife switch 18 for controlling the power circuit of its associated motor and a 3 pole knife switch 19 for controlling the energizing circuits of the aforementioned electromagnetic switches and relays.

The master controller MC includes a master drum 25 and a pair of normally open no-voltage protective relays 26 and 27. Said master drum, as shown in Fig. 3, has extreme door opening and door closing positions and an intermediate off position and the same is provided with stationary contacts 30 to 34, inclusive. In the off position of said drum contacts 30 and 31 engage movable electrically connected contacts 30$^a$ and 31$^a$. In the door closing position of said drum contacts 32 and 34 are engaged by electrically connected movable contacts 32$^b$ and 34$^b$ while in the door closing position thereof contacts 33 and 34 are engaged by electrically connected movable contacts 33$^c$ and 34$^c$.

The no voltage relays 26 and 27 control a circuit between the trolley T$^3$ and the drum 25 and each of said relays is provided with a pair of operating windings "$a$" and "$b$". For purposes hereinafter set forth each of said relays is adapted to respond upon energization of both of its windings and each is adapted to be held in closed position by its winding "$a$" upon deenergization of its winding "$b$".

As shown in Fig. 3, lockout winding 11$^b$ of reversing switch 11 and the operating winding 12$^a$ of reversing switch 12 are connected in series between line L$^1$ and a point X through the medium of limit switch 15 and the auxiliary contacts 11$^d$ of the former reversing switch while the operating winding 11$^a$ of reversing switch 11 and the lockout winding 12$^b$ of reversing switch 12 are connected in series between line L$^2$ and the point X through the medium of limit switch 14 and the auxiliary contacts 12$^d$ of the latter reversing switch. The lockout windings and the operating windings of the reversing switches are thus normally connected across lines L$^1$ L$^2$, but as is apparent said switches cannot respond, due to the holding action of their associated lockout windings. However, it is apparent that upon connection of point X to line L$^1$ the operating winding 11$^a$ of reversing switch 11 and the lockout winding 12$^b$ of reversing switch 12 are connected across lines L$^1$ L$^2$, while the operating winding 12$^a$ of reversing switch 12 and the lockout winding 11$^b$ of reversing switch 11 are shunted by such connection. Thus connection of point X to line L$^1$ causes response of reversing switch 11 and insures holding of reversing switch 12 in open position by its lockout winding. On the other hand, upon connection of point X to line L$^2$ the lockout winding 11$^b$ of reversing switch 11 and the operating winding 12$^a$ of reversing switch 12 are connected across lines L$^1$ L$^2$, while the operating winding 11$^a$ of reversing switch 11 and the lockout winding 12$^b$ of reversing switch 12 are shunted by such connection. Thus connection of the point X to line L$^2$ causes response of reversing switch 12 and insures holding of reversing switch 11 in open position by its lockout winding.

The drum controller 13 of controller C and the master drum 25 each provide for selective connection of the point X to the supply lines. Upon movement of the drum 13 into door opening position point X is connected to line L$^1$ through the medium of contacts 21, 21$^b$, 23$^b$ and 23 and the overload relays 16 and 17 while movement of said drum into door closing position connects point X to line L$^2$, through the medium of said overload relays and contacts 22, 22$^c$, 23 and 23$^c$ of said drum. With drum 13 in off position point X is connected to the shoe S through the medium of one pole of the knife switch 19, contacts 20, 20$^a$, 23 and 23$^a$ of said drum and the overload relays 16 and 17. Assuming that relay 26 is closed and that drum 13 is in off position movement of the drum 25 into its door opening position connects point X to line L$^1$ by a circuit extending from trolley T$^1$ through winding 26$^a$, contacts 32, 32$^b$, 34$^b$ and 34 and through relay 26 and trolley T$^3$ to shoe S. On the other hand, with relay 27 closed and drum 13 in off position movement of the drum 25 into its door closing position connects point X to line L$^2$ by a circuit extending from trolley T$^2$ through winding 27$^a$ through contacts 33, 33$^c$, 34$^c$ and 34 and through relay 27 and trolley T$^3$ to shoe S.

It is thus apparent that drum 13 provides for closure of the reversing switches 11 and 12, selectively; and when said drum is in off position the master drum 25 also serves to effect closure of said switches selectively through the medium of a single trolley connection T$^3$. Upon response of either reversing switch the auxiliary contacts "$c$" associated therewith connect the operating winding 10$^a$ of the main switch 10 across lines L$^1$—L$^2$. The reversing switches 11 and 12 and main switch 10 are connected in the motor circuit as shown in Fig. 3, the motor illustrated being provided with an armature A, a series field F and a shunt field $F^1$. In the foregoing description it is assumed that reversing switch 11 provides for operation of the motor in its door opening direction while reversing switch 12 provides for operation thereof in its door closing direction. Upon opening of the door, limit switch 14 opens to deenergize reversing switch 11 and upon closure of the door, limit switch 15 opens to deenergize reversing switch 12.

Upon closure of reversing switch 12 by the master drum 25 the auxiliary contacts $12^e$ of said reversing switch establish a maintaining circuit therefor extending from line $L^2$ through said auxiliary contacts through a resistance $r^1$ through contacts 20, $20^a$, $23^a$ and 23 of drum 13 and through the overload relays 16 and 17 to point X. The reversing switch 12 is thus maintained energized until the door is closed and accordingly the crane CR can be moved to disengage the trolley $T^3$ from the shoe S without interfering with closing operation of the door.

As hereinbefore stated, the overload relays 16 and 17 are each provided with a pair of operating windings "a" and "b". As shown in Fig. 3, the windings "a" of relays 16 and 17 are connected to opposite terminals of the motor armature whereby the direction of the current in said windings is reversed upon establishment of reverse power connections for the motor. The windings "b" of said relays are connected in series between contact 24 of drum 13 and a point $X^1$ and line $L^1$ is connected to said point through a resistance $r^2$, while line $L^2$ is connected to said point through a resistance $r^3$. With the windings "b" arranged as above described, it is apparent that the current in windings $16^b$ and $17^b$ will be in one direction upon closure of reversing switch 11, and in an opposite direction upon closure of reversing switch 12. Thus upon establishment of reverse power connections for the motor the direction of the current in both of the windings "a" and "b" of each of the relays 16 and 17 will be reversed and said windings are arranged to act cumulatively to effect opening of their associated relays under given overload conditions. Upon response of the relays 16 and 17 the holding windings "b" thereof are adapted to hold the same in open position and in order to effect resetting thereof it is necessary to deenergize said windings by returning the drum 13 or the drum 25, as the case may be, to off position.

When the master drum 25 is in off position the operating windings of the no voltage relays 26 and 27 are connected across lines $L^1$ $L^2$ through the medium of the trolleys $T^1$ and $T^2$ and the contacts 30, $30^a$, 31 and $31^a$ of the master drum. Connection of the windings of the no voltage relays in this manner effects closure of said relays. Upon movement of the master drum into its door opening position the winding $26^a$ is connected in the operating circuit of the reversing switch 11 as hereinbefore described while winding $26^b$ is deenergized and upon movement of the master drum into its door closing position the winding $27^a$ of the relay 27 is connected as hereinbefore described in the energizing circuit of reversing switch 12 while winding $27^b$ is deenergized. Thus during opening of the door winding $26^a$ acts under no-voltage conditions to release relay 26 for interruption of the connection from line $L^1$ to trolley $T^3$ and during closure of the door winding $27^a$ acts under such conditions to release relay 27 for interruption of the connection between line $L^1$ and trolley $T^3$. Since the windings $26^a$ and $27^a$ cannot pick up their associated relays without energization of the windings $26^b$ and $27^b$ it is necessary in order to effect resetting of the no voltage relays to return the master drum 25 to off position.

Assuming that the crane is operated while the master drum is in either of its operative positions, movement of the trolley $T^3$ out of engagement with the shoe S interrupts the energizing circuit for the holding winding of the no-voltage relay which is in closed position. Thus it is necessary when the trolley $T^3$ is brought into engagement with another shoe to return the master drum to off position before the motor associated with the latter shoe can be operated.

Referring now to Fig. 4, the same illustrates a modification of the no-voltage protective means shown in Fig. 3. Two relays 40 and 41 are employed in connection with the master drum, each of which is provided with a single operating winding. The operating winding of relay 40 is arranged to be connected across lines $L^1$ $L^2$ by contacts 30, $30^a$, 31 and $31^a$ of the master drum when the latter is in off position. Closure of relay 40 establishes a connection between trolley $T^3$ and the contact 34 of the master drum through the operating winding of the relay 41. Upon movement of the drum into either of its operative positions the relay 41 is connected in the energizing circuit of one or the other of the reversing switches and the same in closing connects the operating winding of relay 40 across lines $L^1$—$L^2$. Under no voltage conditions or upon movement of the trolley $T^3$ out of engagement with the shoe S the relays 40 and 41 are deenergized and the former relay interrupts the connection between trolley $T^3$ and the drum 25. In order to effect resetting of relay 40 it is necessary to return the master drum to off position. The relays 40 and 41 thus provide the same protection afforded by the relays 26 and 27 shown in Fig. 3.

What I claim as new and desire to secure by Letters Patent is:

1. In a motor controller, the combination with a source of current, of a pair of normally open electromagnetic reversing switches having their operating windings connected in series across said source, a master switch normally connected to a point intermediate said windings and movable from a given off position into other positions to connect such point to the positive or negative side of said source to thereby provide for closure of said switches selectively, and means for disconnecting said master switch from said operating windings under low voltage conditions in said source, said means necessitating return of said master switch to off position as a prerequisite to reconnection of said master switch to said windings.

2. The combination with a pair of electromagnetic reversing switches and a circuit to be controlled thereby, of a master switch having an off position and movable into other positions to selectively control said reversing switches through the medium of a single conductor connected to the operating windings of both of said switches and a relay for deenergizing said operating windings under given overload conditions in the circuit controlled by said reversing switches, said relay having a pair of operating windings adapted to act cumulatively to effect opening thereof, one of said windings being energized upon closure of either of said reversing switches and the other being energized by said master switch upon movement thereof out of off position, said latter winding being adapted upon opening of said relay to hold the same in such position pending return of said master switch to off position.

3. The combination with a pair of electromagnetic reversing switches, each having an operating winding, and a lockout winding associated therewith, said windings being permanently connected in series to a source of current, a master switch adapted to act through the medium of a single conductor to selectively render either of said reversing switches operative and the other inoperative by shunting the lockout winding of the former switch and the operating winding of the latter switch and an overload relay adapted to act under given overload conditions in the circuit controlled by said reversing switches to disconnect the windings of said reversing switches from said master switch and to thereafter prevent reconnection of said windings to said master switch except upon return of the latter to off position.

4. The combination with a pair of electromagnetic reversing switches, of a master switch for selectively controlling said reversing switches through the medium of a single conductor connected to the operating windings of both of said switches, and separate electroresponsive relays for disconnecting the operating windings of said reversing switches from said master controller, one of said relays being adapted to open upon failure of voltage and the other being adapted to open upon given overload conditions in the circuit controlled by said switches, and means necessitating return of said master switch to off position as a prerequisite to reclosure of either of said relays.

5. In a furnace door controller, the combination with a door operating motor, of a pair of electromagnetic reversing switches for selectively establishing reverse power connections for said motor, a control switch having an off position and movable into other positions to selectively control said reversing switches through the medium of a single conductor, a second control switch having an off position and movable into other positions to selectively control said reversing switches through the medium of said former control switch, but only when said former control switch is in off position, and means for disconnecting said second mentioned control switch from said reversing switches under low voltage conditions in the motor circuit, said means necessitating return of said second mentioned control switch to off position as a prerequisite to reconnection thereof to said reversing switches.

6. In a furnace door controller, the combination with a door operating motor, of a pair of normally open electromagnetic reversing switches, one being responsive to effect operation of said motor in its door closing direction, and the other being responsive to effect operation thereof in its door opening direction, a control switch having an off position and movable into other positions to selectively control said reversing switches through the medium of a single conductor, a second control switch having an off position and movable into other positions to selectively control said reversing switches through the medium of said former control switch but only when said former control switch is in off position, means for establishing a maintaining circuit for said first mentioned reversing switch through the medium of said first mentioned control switch when the latter is in off position, and limit switches for controlling said reversing switches to effect stopping of said motor in its door opening and closing positions.

7. In a motor controller, the combination with a source of current, of a pair of normally open electromagnetic reversing switches having their operating windings connected in series across said source, a master switch normally connected to a point intermediate the operating windings of said switches and movable from a given off position into other positions to selectively connect such point to the positive or negative side of said source to thereby effect closure of said reversing switches selectively, and a plurality of relays each for disconnecting said master switch from said operating windings, certain of said relays being responsive under low voltage conditions in said source and certain being responsive upon given overload conditions in the circuit controlled by said reversing switches, each of said relays in responding necessitating return of said master switch to off position as a prerequisite to reconnection of said master switch to said operating windings.

8. In a control system for a battery of furnace doors, the combination with a driving motor for each of the doors, and a supply circuit for said motors, of a controller for each of said motors including a pair of electromagnetically operated reversing switches, a traveling master switch adapted to cooperate with any one of said controllers to selectively control the reversing switches thereof through the medium of a single trolley connection, and means associated with said master switch for interrupting the trolley connection thereof under low voltage conditions in said supply circuit, and for preventing reestablishment of such connection except upon positioning of said master switch in a given off position.

In witness whereof, I have hereunto subscribed my name.

PAISLEY B. HARWOOD.